United States Patent
Spinelli et al.

(10) Patent No.: US 8,888,264 B2
(45) Date of Patent: Nov. 18, 2014

(54) METHOD OF PREPARING DISPERSIONS

(75) Inventors: Harry Joseph Spinelli, Wilmington, DE (US); Tristan Williams, Cary, NC (US); Michael Stephen Wolfe, Wilmington, DE (US); Howard Zakheim, Bala Cynwyd, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 373 days.

(21) Appl. No.: 13/387,778

(22) PCT Filed: Jul. 29, 2010

(86) PCT No.: PCT/US2010/043646
§ 371 (c)(1),
(2), (4) Date: Jan. 30, 2012

(87) PCT Pub. No.: WO2011/014615
PCT Pub. Date: Feb. 3, 2011

(65) Prior Publication Data
US 2012/0127235 A1    May 24, 2012

Related U.S. Application Data

(60) Provisional application No. 61/229,895, filed on Jul. 30, 2009.

(51) Int. Cl.
| | | |
|---|---|---|
| C09D 11/00 | (2014.01) | |
| C09D 11/322 | (2014.01) | |
| C09B 7/00 | (2006.01) | |
| C09D 11/40 | (2014.01) | |

(52) U.S. Cl.
CPC ............... *C09D 11/40* (2013.01); *C09D 11/322* (2013.01); *C09B 7/00* (2013.01)

USPC .......................................................... 347/100

(58) Field of Classification Search
USPC .......................................................... 347/100
See application file for complete search history.

(56) References Cited

U.S. PATENT DOCUMENTS

| | | | |
|---|---|---|---|
| 4,665,107 A | 5/1987 | Micale | 523/105 |
| 5,310,778 A | 5/1994 | Shor et al. | 524/556 |
| 7,077,516 B2 * | 7/2006 | Chen et al. | 347/100 |

FOREIGN PATENT DOCUMENTS

| | | | | |
|---|---|---|---|---|
| EP | 0 808 882 A2 | 11/1997 | | |
| EP | 0 924 272 A1 | 6/1999 | | |
| EP | 928821 A1 * | 7/1999 | | C09D 11/00 |
| EP | 1 988 132 A1 | 11/2008 | | |
| WO | WO 2009076381 A1 * | 6/2009 | | C08G 18/08 |

OTHER PUBLICATIONS

Written Opinion of the International Search Authority, PCT/US2010/043646, PCT counterpart of the present application, Volker Schmitz, Authorized Officer, European Patent Office, Munich, DE, Feb. 9, 2012.

* cited by examiner

*Primary Examiner* — Laura Martin
(74) *Attorney, Agent, or Firm* — John H. Lamming

(57) ABSTRACT

A process for preparing dispersions of particles, especially aqueous dispersions is described. The process relates to a dispersion process where a polar solvent is added during the dispersion process such that the hydrogen bonding solubility parameter component, $\delta_h$, of the initial dispersion mixture increases at least 1.5 units. When the polar solvent added is water the dispersion process is called a Solvent-to-Water Process.

20 Claims, 1 Drawing Sheet

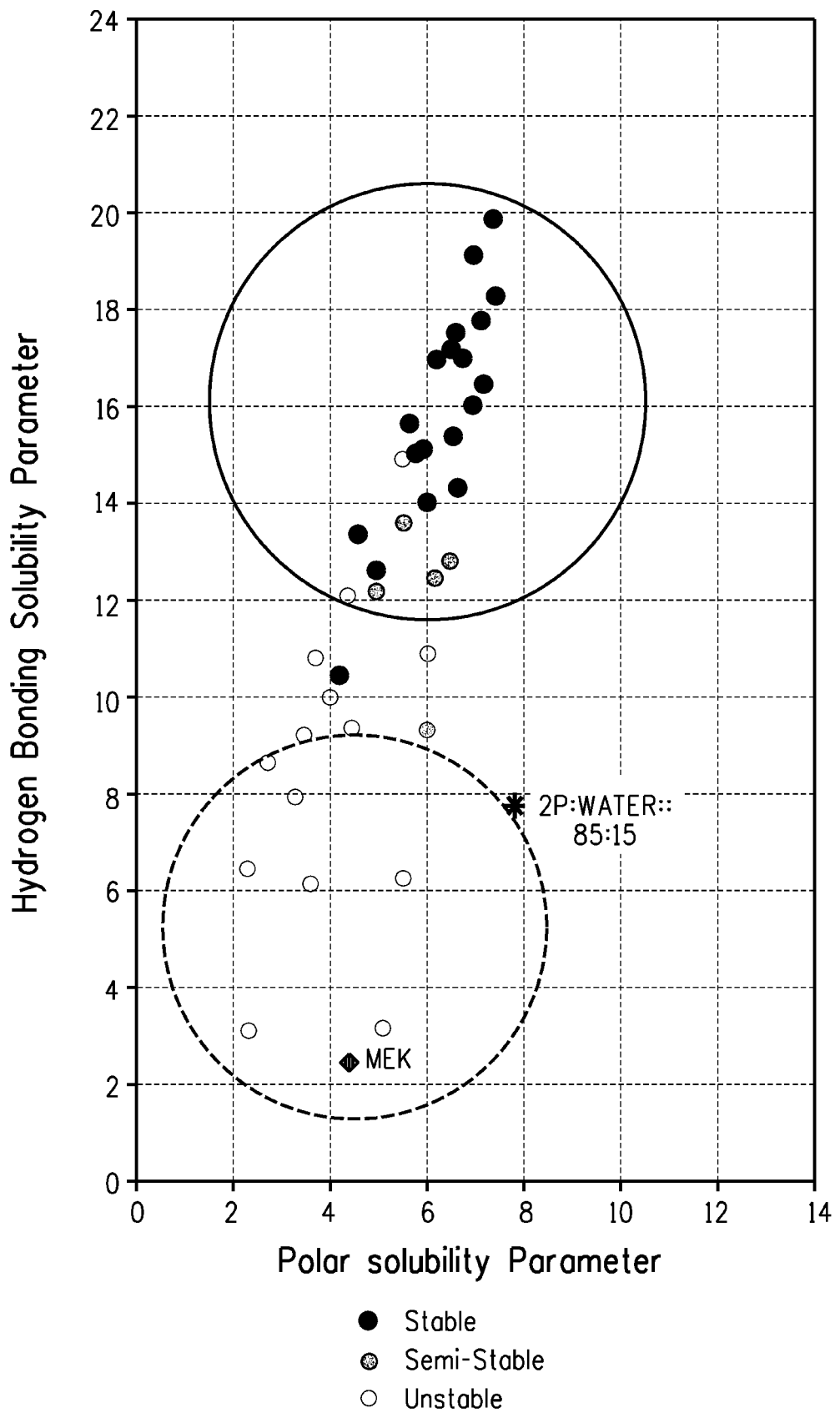

METHOD OF PREPARING DISPERSIONS

CROSS-REFERENCE TO RELATED APPLICATION

This application claims priority under 35 U.S.C. §119 from U.S. Provisional Application Ser. No. 61/229,895, filed Jul. 30, 2009.

BACKGROUND OF THE INVENTION

The present invention pertains to a process for preparing dispersions of particles, especially aqueous dispersions. These dispersions may be used in the preparation of aqueous inkjet inks, pigmented paints, pharmaceuticals, agricultural products, etc. More particularly, the invention relates to a dispersion process where a polar solvent is added during the dispersion process such that the hydrogen bonding solubility parameter component, $\delta_h$, of the initial dispersion mixture increases at least 1.5 units.

Dispersion methods are commonly used to disperse particles. A variety of dispersion processes have been described for dispersing particles. For ink jet inks pigments are dispersed with polymeric dispersants. One such process is the two-roll mill preparation of polymer dispersed pigments for ink jet inks as described in U.S. Pat. No. 5,310,778.

A media mill dispersion using plastic substantially cubic media is described in US20030089277.

US20050009977 describes obtaining a pigment treated with water insoluble vinyl polymer particles in an aqueous solvent and then removing the solvent.

U.S. Pat. No. 6,723,705 describes a process for obtaining an aqueous dispersion of pigment containing polymer particles with a key step being the removing the solvent to obtain a solvent-removed product.

U.S. Pat. No. 6,866,707 describes two processes to obtain a polymer/pigment system: 1) a phase inversion emulsification where water is added to a mixture of polymer and pigment resulting in a phase inversion; 2) a pH change system where a pigment dispersed with a resin (polymer) is neutralized with a basic compound to shift the pH to fix the resin onto the pigment.

U.S. Pat. No. 6,924,035 describes a process in which a combination of solvents is used and a polymer is precipitated form the mixture of solvents onto the finely dispersed pigment particles.

There is still need for improved dispersion processes, especially for the production of colorant dispersions for high performance end use applications such as ink jet ink and exterior paints for vehicles such as automobiles and trucks.

None of the above publications disclose dispersing processes or other polymer/pigment processing steps that describe a dispersion process where a polar solvent is added during the dispersing process such that the hydrogen bonding solubility parameter component of the initial dispersion mixture increases at least 1.5 units. It has been discovered that these polymer dispersed pigments have a better balance of properties to permit formulating latitude in the ink jet inks and can produce improved optical properties.

SUMMARY OF THE INVENTION

Adding a polar solvent during the dispersing process leads to unexpectedly improved dispersions of particles. These dispersions are particularly effective for the preparation of dispersed pigments for ink jet inks.

Accordingly, the present invention provides a method for preparing a dispersion of dispersible particles, comprising the steps of a) preparing an initial mixture comprising an initial solvent, dispersible particles, at least one polymeric dispersant, and optionally a neutralizing agent;

b) subjecting the initial mixture to dispersion treatment while adding polar diluent liquid, such that the final dispersion of the particles is a stable dispersion and wherein the hydrogen bonding solubility parameter of a final solvent mixture is at least 1.5 units higher than the initial solvent; and where the hydrogen bonding solubility parameters are calculated based on Hansen parameters and weight/weight additive calculations.

In another embodiment there is provide a process for preparing a aqueous pigment dispersion, comprising the steps of a) preparing an initial mixture comprising an initial solvent, a pigment particles, a polymeric dispersant, and optionally a neutralizing agent;

b) subjecting the initial mixture to dispersion treatment while adding polar diluent liquid, such that the dispersion of pigment particles is a stable dispersion and wherein the hydrogen bonding solubility parameter component of the final solvent mixture is at least 1.5 units higher than the initial solvent; and where both the hydrogen bonding solubility parameters are calculated based on Hansen parameters and weight/weight additive calculations.

In the case of using water as the polar diluent liquid the process can be called a Solvent-to-Water process.

Another embodiment provides an aqueous pigment dispersion made according to the above process which is incorporated into an ink jet ink. Another embodiment provides a process for printing with ink jet inks that contain the aqueous pigment dispersions made according to the above process.

The polymeric dispersants that can be used for dispersing particles by this process include random and structured polymers commonly used for particles especially for inkjet ink pigments. Recently described polymeric dispersants that primarily rely on ionic stabilization (US20050090599) and polyurethane dispersants with low ionic content (US20090259012) are also effectively used with this process. The polymeric dispersant can be neutralized prior to, during or after the start of the dispersion process.

In accordance with another embodiment, there is provided an aqueous pigmented ink jet ink comprising an aqueous pigment dispersion as described above. The pigment ink jet ink has from about 0.1 to about 75 wt % pigment based on the total weight of the ink, a surface tension in the range of about 20 dyne/cm to about 70 dyne/cm at 25° C., and a viscosity of lower than about 30 cP at 25° C.

In still another embodiment, there is provided an ink set comprising at least one cyan ink, at least one magenta ink and at least one yellow ink, wherein at least one of the inks is an aqueous pigmented ink jet ink as set forth above and described in further detail below.

In yet another embodiment there is provided a method for ink jet printing onto a substrate, comprising the steps of:
(a) providing an ink jet printer that is responsive to digital data signals;
(b) loading the printer with a substrate to be printed;
(c) loading the printer with an ink as set forth above and described in further detail below, or an ink jet ink set as set forth above and described in further detail below; and
(d) printing onto the substrate using the ink or inkjet ink set in response to the digital data signals.

These and other features and advantages of the present invention will be more readily understood by those of ordinary skill in the art from a reading of the following detailed description. One of skill can appreciate that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise. Further, reference to values stated in ranges include each and every value within that range.

BRIEF DESCRIPTION OF THE DRAWING

FIG. 1 depicts the solubility map for a polymerically dispersed magenta pigment with a 92/8:benzylmethacrylate/methacrylic acid random polymer dispersant.

DETAILED DESCRIPTION

Unless otherwise stated or defined, all technical and scientific terms used herein have commonly understood meanings by one of ordinary skill in the art to which this invention pertains.

Unless stated otherwise, all percentages, parts, ratios, etc., are by weight. When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

As used herein, the term "dispersion" means a two phase system where one phase consists of finely divided particles (often in the colloidal size range) distributed throughout a bulk substance, the particles being the dispersed or internal phase and the bulk substance the continuous or external phase. The bulk system is often an aqueous system.

As used herein, the term "dispersion of pigment particles" is a stable dispersion of polymeric dispersed pigments which are normally used in inks and paints.

As used herein, the term "aqueous pigment dispersion" is an aqueous dispersion of pigments using polymeric dispersants.

As used herein, the term "dispersant" means a surface active agent added to a suspending medium to promote uniform and maximum separation of extremely fine solid particles often of colloidal size. For pigments, the dispersants are most often polymeric dispersants and usually the dispersants and pigments are combined using dispersing equipment.

As used herein, the term "dispersible particles" are those particles that can be dispersed with polymeric dispersants.

As used herein, the term "stable dispersion" means a particle dispersion where the particle size growth is less than 10% particle size growth and no flocculation when the dispersion is stored at room temperature for at least a week.

As used herein, the term "pigment" means any substance usually in a powder form which imparts color to another substance or mixture. Disperse dyes, white and black pigments are included in this definition.

As used herein, the term "ionically stabilized polymeric dispersants" describes polymer dispersants which have primarily ionic stabilization with little steric stabilization of dispersed particles.

As used herein, the term HSD means High Speed. Dispersing.

As used herein, the term "OD" means optical density.

As used herein, the term "Gloss" means observation of reflected light from a printed surface, normally the printed substrate is glossy paper As used herein, the term "SDP" means a self-dispersible" or "self-dispersing" pigments.

As used herein, the term "solvent parameter" means systems of describing solvents and were developed as a way of predicting if one material will dissolve in another.

As used herein, the term "Hansen solvent parameter" is a solvent parameter system that was developed by Charles Hansen.

As used herein, the term "hydrogen solvent parameter" means the energy from hydrogen bonds between molecules as used in the Hansen solvent parameter system. It is denoted by $\delta_h$.

As used herein, the term "polar solvent" means those solvents that have a hydrogen bonding solubility parameter greater than 9.

As used herein, the term "weight/weight additive calculations" means that the calculations done for the solvent parameters are done by weight/weight proportions of the liquid components.

As used herein, the term "free polymer", means the polymeric dispersant which is unbound to the particle, and is determined by gravimetric % solids on the supernatant of the sample, after the pigment is removed by centrifugation.

As used herein, the term "Solvent-to Water" means the inventive process described herein where the added polar solvent is water.

As used herein, the term "aqueous vehicle" refers to water or a mixture of water and at least one water-soluble organic solvent (co-solvent).

As used herein, the term "ionizable groups", means potentially ionic groups.

As used herein, the term "substantially" means being of considerable degree, almost all.

As used herein, the term "Mn" means number average molecular weight.

As used herein, the term "Mw" means weight average molecular weight.

As used herein, the term "Pd" means the polydispersity which is the weight average molecular weight divided by the number average molecular weight.

As used herein, the term "d50" means the particle size at which 50% of the particles are smaller; "d95" means the particle size at which 95% of the particles are smaller.

As used herein, the term "cP" means centipoise, a viscosity unit.

As used herein, the term conductivity means the property of a substance or mixture that describes its ability to transfer electricity.

As used herein, the term "pre-polymer" means the polymer that is an intermediate in a polymerization process, and can also be considered a polymer.

As used herein, the term "AN" means acid number, mg KOH/gram of solid polymer.

As used herein, the term "neutralizing agents" means to embrace all types of agents that are useful for converting ionizable groups to the more hydrophilic ionic (salt) groups.

As used herein, the term "PUD" means the polyurethanes dispersions described herein.

As used herein, the term "BMEA" means bis(methoxyethyl)amine.

As used herein, the term "DBTL" means dibutyltin dilaurate.

As used herein, the term "DMPA" means dimethylol propionic acid.

As used herein, the term "GPC" means gel permeation chromatography.

As used herein, the term "IPDI" means isophorone diisocyanate.

As used herein, the term "TMDI" means trimethylhexamethylene diisocyanate.

As used herein, the term "ETEGMA//BZMA//MAA" means the block copolymer of ethoxytriethyleneglycol methacrylate, benzylmethacrylate and methacrylic acid.

As used herein the term T650 means TERATHANE® 650; see below.

As used herein, the term "NMP" means n-Methyl pyrrolidone.

As used herein, the term "TEA" means triethylamine.

As used herein, the term "THF" means tetrahydrofuran.

As used herein, the term "Tetraglyme" means Tetraethylene glycol dimethyl ether.

Unless otherwise noted, the above chemicals were obtained from Aldrich (Milwaukee, Wis.) or other similar suppliers of laboratory chemicals.

TERATHANE 650 is a 650 molecular weight, polytetramethylene ether glycol (PTMEG) from purchased from Invista, Wichita, Kans.

While trying different polymeric dispersants to obtain stable pigment dispersion for ink jet inks, the inventors observed that if during the dispersion process the initial dispersion mixture was changed by adding a more polar solvent in a continuous or a semi-continuous fashion, better dispersed pigments could be obtained. The best way to describe the changes in the solvent system during the dispersing process is to compare the initial solvent to the final solvent mixture by calculating the initial hydrogen bonding solubility parameter component $\delta_h$ for the initial dispersion solvent mixture and calculating the final dispersion solvent mixture after adding the more polar solvent. The change in the hydrogen solubility parameter $\delta_h$ is an increase of at least 1.5 $cal^{1/2}/cm^{3/2}$.

Accordingly; the present invention provides a method for preparing a dispersion of dispersible particles, comprising the steps of
  a) preparing an initial mixture comprising an initial solvent, dispersible particles, at least one polymeric dispersant, and optionally a neutralizing agent;
  b) subjecting the initial mixture to dispersion treatment while adding polar diluent liquid, such that the final dispersion of the particles is a stable dispersion and
  wherein the hydrogen bonding solubility parameter of a final solvent mixture is at least 1.5 units higher than the initial solvent; and
  where the hydrogen bonding solubility parameters are calculated based on Hansen parameters and weight/weight additive calculations.

Dispersible particles include pigments used for ink jet inks, pigments used for paints, pharmaceutical products and agricultural products. These particles must be capable of being dispersed by the polymeric dispersants described herein. The preferred particle is a pigment.

The solvent parameters used are the Hansen parameters as described by A. F. M. Barton in Chemical Reviews, 1975, vol 75, no. 6 pages 731 to 753. A similar description of the use of Hansen parameters is given by Barton in *CRC Handbook of Solubility Parameters and Other Cohesion Parameters, 2nd Edition,* ©1991. Hansen parameters have three components: a hydrogen bonding component, a polar component and a dispersion component. For purposes of this invention the polar and dispersion component are not used. The units being used are $cal^{1/2}/cm^{3/2}$. Often the solubility parameters are reported as dimensionless numbers since the calculation for the initial and final dispersion mixtures are using the same calculation basis.

The initial solvent is chosen such that the polymeric dispersant is at least very soluble in the initial solvent and the polymerically dispersed pigment is stable in the final dispersion mixture which has had the polar solvent added during the dispersion process. The dispersing process is taking place simultaneously to the addition of the polar diluent liquid. The disperser can be configured for continuous addition of the polar diluent liquid, or it can be added in a multiple batches to make it a semi-continuous addition of the polar solvent.

During the time when the polar diluent liquid is added to the dispersing system, it is important that the polymer/pigment mixture is exposed to dispersing conditions. The addition of the polar diluent liquid is done in a continuous mode or non continuous mode. For the latter condition, the equipment may not permit continuous addition, but require deactivation of the dispersing condition while the polar diluent liquid is added. Thus, the polar diluent liquid must be added in at least three aliquots for the inventive dispersion to occur. These aliquots can vary in relative amount, but typically equal amount aliquots would be added. That is, for three aliquots, three equal amounts of polar diluent liquid would be added.

The changes in the solvent used during the dispersing process is denoted by the solubility parameter component $\delta_h$, hydrogen bonding solubility parameter of the initial mixture and the $\delta_h$ of the final solvent mixture. The increase in $\delta_h$ between the initial solvent and the final solvent mixture is 1.5, or more preferred is an increase of 2 and even more preferred an increase of 3. The hydrogen bonding solubility parameter for these solvent mixtures is calculated using weight/weight calculations. That is, an initial solubility parameter for a triethyleneglcol monobutyl ether (TEB) initial solvent is ~4. After the water is added to obtain a 52:48 TEB:water, the calculated $\delta_h$ solubility parameter is ~11.9 based on weight/weight calculations, an increase of ~7.9.

The initial solvent may be a single organic solvent or a mixture of solvents with other solvents or mixtures with water. Typical solvents for the initial solvent includes ethers, ketones, aldehydes, esters, nitrogen compounds, sulfur compounds, acid halides and anhydrides, alcohols and mixtures thereof. Solvents like alkanes, aromatic hydrocarbons, halohydrocarbons, and the like will not work as they are not particularly good solvents for the dispersants and, in general, are not miscible in the more polar solvents that are added during the dispersing time.

Examples of initial solvent include organic solvent such as alcohols, esters, ketones, and ethers. Specific examples include mono- and di-alkyl ethers of glycols and polyglycols, such as monomethyl ethers of mono-, di- and tri-propylene glycols, and the mono-n-butyl ethers of ethylene, diethylene and triethylene glycols and glycerol and substituted glycerols.

Glycol ethers include ethylene glycol mono-methyl ether, ethylene glycol mono-ethyl ether, ethylene glycol mono-propyl ether, ethylene glycol monobutyl ether, diethylene glycol mono-methyl ether, diethylene glycol mono-ethyl ether, diethylene glycol mono-propyl ether, diethylene glycol mono-n-butyl ether, triethylene glycol mono-n-butyl ether, 1-methyl-1-methoxybutanol, propylene glycol mono-methyl ether, propylene glycol mono-ethyl ether, propylene glycol mono-butyl ether, propylene glycol mono-propyl ether, dipropylene glycol mono-methyl ether, dipropylene glycol mono-ethyl ether, dipropylene glycol mono-n-butyl ether, dipropylene glycol mono-n-propyl ether, and dipropylene glycol mono-isopropyl ether.

Ether solvents include but are not limited to include dioxane, dimethyl ether, diethyl ethyl, di-isopropyl ether, tetrahydrofuran, glyme, diglyme, triglyme, and tetraglyme.

Heteroatom solvents include, but are not limited to amide solvents including dimethylacetamide and cyclic amines such as 2-pyrrolidinone, N-methyl 2-pyrrolidone, and sulfur containing solvents including but not limited to dimethyl sulfoxide and sulfolone.

Ketones include methylethyl ketone, methyl isobutyl ketone acetone and diacetone alcohol and the like.

Polyhydroxyl solvents include ethylene glycol, diethylene glycol, triethylene glycol, tetraethylene glycol, propylene glycol, dipropylene glycol, trimethylol propane, butanediol, pentanediol, hexanediol.

The criteria for choosing the solvent(s) for the initial solvent is that the polymeric dispersant is at least very soluble in the initial solvent and is miscible during the dispersion process while the polar solvent is being added.

The polar diluent mixture may be a single polar solvent or a mixture of polar solvents. Polar solvents are those that have a hydrogen bonding solubility parameter greater than 9 or more preferably more than 10. These include water, ethanol, methanol, ethylene glycol, propylene glycol, and glycerol and mixtures thereof.

Typically, the polar diluent mixture added is water, but also low molecular weight alcohols such as ethanol and methanol can be used. It is preferred that the initial dispersion mixture, the final dispersion mixture and the intermediate compositions are miscible with each other and that these mixtures are one phase. That is, it is preferred that at no time during the dispersion process/addition of polar solvent does the dispersion mixture separate into two liquid phases.

Mixtures of miscible solvents may be used as the initial solvent. For instance a solution of 80% triethylene glycol butyl ether and 20% water may be used as the initial solvent or even a 60:40 mixture. Water may constitute up to about 50% of the initial mixture.

The solubility of the polymeric dispersants is determined by testing different solvents and mixtures of solvents including water, to determine whether the polymeric dispersant is soluble. A solubility map utilizing polar solubility parameter component $\delta_d$ as the x-axis and the hydrogen bonding solubility parameter component $\delta_h$ as the y-axis is created by testing several solvents diluted to 0, 20, 40, 60 and 80 weight percent water. For example, the following solvents are used to test the solubility of a polymeric dispersant. The solubility parameter is commonly treated as a dimensionless number.

TABLE 1

Solubility Parameters

| Solvent | Hydrogen bonding parameter | Polar parameter |
|---|---|---|
| acetone | 3.4 | 5.1 |
| tetrahydrofuran | 3.9 | 2.8 |
| methanol | 10.9 | 6 |
| diethylene glycol | 8.5 | 4.2 |
| diethylene glycol monobutyl ether | 5.2 | 3.4 |
| 2-methyl-2,4-pentanediol | 8.8 | 2.8 |
| isopropanol | 7.9 | 3.2 |
| glycerol | 14 | 5.8 |
| water | 20.7 | 7.8 |

At each solvent mixture polymeric dispersant is added to make up about 1% weight percent mixture and the mixture is shaken and the liquid observed. If there is a colorless liquid, the polymeric dispersant is considered soluble in the solvent; if the polymeric dispersant sinks to the bottom, insoluble; and if a hazy solution is observed than the polymer dispersant is considered to form a stable dispersion in the solvent mixture. The preferred form of the polymeric dispersant for these solubility tests is that the dispersant is in its neutralized form.

Thus, a solubility map of the polymeric dispersant is developed which shows where the polymeric dispersant is soluble. FIG. 1 shows this for an Ionically Stabilized Dispersant which is a random polymer with a 92:8::benzylmethacrylate:methacrylic acid composition which has been neutralized. The area inside the lower circle (solid line) shows the solubility map area where the polymer is soluble.

With the same combination of solvents and water a dispersed particle may also be mapped. The upper circle (dashed line) shows where the polymeric dispersion of a magenta pigment is stable using the neutralized 92:8 benzyl methacrylate:methacrylic acid dispersant. The specific measurements of the stable dispersed pigment are shown with dark circles. At the data points depicted by the gray circles the magenta dispersion is considered semi-stable which means that under a microscope, there are signs of flocculation. The expectations are that over time, the flocculated particle will settle out. The open circles depict where the magenta dispersion is unstable, as indicated by flocculation of the dispersion.

The product of this process is a stable dispersed particle. This stable particle dispersion is one that has less than 10% particle size growth and no flocculation when the dispersion is stored at room temperature for at least a week. More rigorous testing that entail accelerated testing by heating samples for a week or more can also be used to determine the stability of the particle dispersions. The optimal particle dispersion stability would depend on the particle characteristics and/or final use. Another criteria for a stable disperse particle is that it can be processed under the processing conditions and not gel or have other adverse properties.

The dispersing step may be accomplished in an ultrasonicator, media mill, a horizontal mini mill, an attritor, or by passing the mixture through a plurality of nozzles within a liquid jet interaction chamber at a liquid pressure of at least 5,000 psi to produce a uniform dispersion of the pigment particles in the aqueous carrier medium (microfluidizer). The media for the media mill is chosen from commonly available media, including zirconia, YTZ, and nylon. The media can be as small as about 0.1 microns, although particles larger than 0.3 microns are commonly used. These various dispersion processes are in a general sense well known in the art, as exemplified by U.S. Pat. No. 5,022,592, U.S. Pat. No. 5,026,427, U.S. Pat. No. 5,891,231, U.S. Pat. No. 5,679,138, U.S. Pat. No. 5,976,232 and US20030089277. Preferred are media mill, and by-passing the mixture through a plurality of nozzles within a liquid jet interaction chamber at a liquid pressure of at least 5,000 psi. The mixing intensity required for the process is mixing normally associated with dispersion processes and not turbulent mixing of more modest mixing processes.

Combinations of dispersing equipment may be used. It may be more convenient to mix the solvent mixture, particle and polymeric dispersant in a High Speed Disperser (HSD) followed by milling in a media mill or a microfluidizer. The addition of the polar solvent may occur during the HSD portion of the processing and then the milling is continued in the media mill.

The final use of the particle dispersion may require that the solvent be removed from the particle dispersion mixture. The solvent may be removed by distillation processing, ultrafiltration or other convenient means. Any of these solvent removal methods may be incorporated into the process. The dispersing equipment and the solvent removal may be coupled and the solvent may be removed during the dispersing process and during the addition of the polar solvent.

One way to monitor the progress of the dispersion process is to measure the particle size and set a target value for the final D50 of the mixture. For typical pigments used for ink jet inks the target value of the D50 is 125 nm or less, preferably less than 100 nm.

The polymeric dispersant used to stabilize the particle is preferably either a structured or random polymers. The use of random polymers for dispersing pigments for ink jet inks were described in U.S. Pat. No. 4,597,794. The term "structured polymer" can mean polymers having a block, branched or graft structure. Examples of structured polymers include AB or BAB block copolymers such as disclosed in U.S. Pat. No. 5,085,698; ABC block copolymers such as disclosed in EP-A-0556649; and graft polymers such as disclosed in U.S. Pat. No. 5,231,131. Other polymeric dispersants that can be used are described, for example, in U.S. Pat. No. 6,117,921, U.S. Pat. No. 6,262,152, U.S. Pat. No. 6,306,994 and U.S. Pat. No. 6,433,117. Recently described polymeric dispersants that primarily rely on ionic stabilization (US20050090599) and polyurethane dispersants including those with low ionic content (US20090259012) are also effectively used with this process.

Ionically Stabilized Polymeric Dispersants as described in US20050090599 can be effectively used with this Solvent to Water Dispersion Process. ISD polymeric dispersants are limited to the amount of ionic content. For random, linear copolymer, diblock, graft and branched polymers, the limit of hydrophilic monomers is from about 1 mole percent to less than about 20 mole percent, based on all of the monomers. Alternatively, the limit of hydrophilic monomers is from about 2 mole percent to less than about 15 mole percent based on all of the monomers. For ABA triblocks, the limit is from about 2 mole percent to less than about 38 mole percent and, alternatively, less than about 25 mole percent. For BAB, triblocks the limit is from about 2 mole percent to less than about 25 mole percent. Optionally, the random polymer may have an acid number of less than about 70. For each of these ionic limitations, the salt stability test of the pigment dispersion or ink jet ink is the determining factor relative to ionic content. This test is described in US20050090599.

Polymer dispersants suitable for use in the present invention generally comprise both hydrophobic and hydrophilic monomers. Some examples of hydrophobic monomers used in random polymers are methyl methacrylate, n-butyl methacrylate, 2-ethylhexyl methacrylate, benzyl methacrylate, 2-phenylethyl methacrylate and the corresponding acrylates. Examples of hydrophilic monomers are methacrylic acid, acrylic acid, dimethylaminoethyl(meth)acrylate and salts thereof. Also quaternary salts of dimethylaminoethyl(meth) acrylate may be employed.

Generally speaking the hydrophobic region is the part that contains the absorbing segment, which is the segment or function of the dispersant interacting with the pigment surface to effect dispersion. The hydrophilic segment is the segment that provides the stability of dispersion by interaction in the solute mixture to provide stabilization. This stabilization is characterized as steric stabilization or ionic stabilization. These phenomena were described by H Spinelli in Adv. Mater, 1998, 10, no. 15, page 1215 to 1218.

The polymeric dispersant can be neutralized prior to the start of the dispersion process. That is, the initial mixture of solvent blend and polymer dispersant has an appropriate amount of neutralizing agent. Alternatively, the neutralizing agent may be added with the polar solvent during the dispersing process. An additional option is to have the polymeric dispersant partially neutralized in the initial mixture and add additional neutralizing agent in the polar solvent. The amount of neutralization of the polymeric dispersant in the final mixture is up to about 100% neutralized, and preferably up to about 90% neutralized.

The neutralizing agent can be hydroxides of the alkali metals, amines and the like. Examples of neutralizing agents organic bases such as mono-, di, tri-methylamine, morpholine, n-methyl morpholine; alcohol amines such as dimethyl-ethanolamine (DMEA), methyldiethanolamine, mono-, di, and tri-ethanolamine; pyridine; ammonium hydroxide; tetra-alkylammonium salts such as tetramethylammonium hydroxide, tetraethyl-ammonium hydroxide; alkali metals such as lithium, sodium and potassium, and the like. Preferred neutralizing agents include dimethylethanolamine and sodium and potassium hydroxides, with potassium hydroxide being particularly preferred for inks to be used in thermal ink jet printers.

While not being bound by theory an effective dispersant is one that is not completely soluble at the solution mixture of the final dispersion mixture. If the dispersant is completely soluble in solution mixture there is little driving force for the dispersant to interact with the pigment surface and behave as a dispersant.

The particles that can be dispersed by this process include pigments, agricultural particles, pharmaceuticals and the like.

A wide variety of organic and inorganic pigments, alone or in combination, may be selected for dispersion by this process. The dispersed pigment may be used in paints, inks and especially ink jet inks. The term "pigment" as used herein means an insoluble colorant and includes disperse dyes. The pigment particles are sufficiently small to permit free flow of the ink through the inkjet printing device, especially at the ejecting nozzles that usually have a diameter ranging from about 10 micron to about 50 micron. The particle size also has an influence on the pigment dispersion stability, which is critical throughout the life of the ink. Brownian motion of minute particles will help prevent the particles from flocculation. It is also desirable to use small particles for maximum color strength and gloss.

The selected pigment(s) may be used in dry or wet form. For example, pigments are usually manufactured in aqueous media and the resulting pigment is obtained as water-wet presscake. In presscake form, the pigment is not agglomerated to the extent that it is in dry form. Thus, pigments in water-wet presscake form do not require as much deflocculation in the process of preparing the inks as pigments in dry form. Representative commercial dry pigments are listed in U.S. Pat. No. 5,085,698.

The amount of particle to polymeric dispersant ranges from about 0.33 to about 400. This ratio is based on the mass of the particle and the polymeric dispersant added to the dispersion. For organic pigments the ratio is about 0.33 to 12, preferably 0.5 to 10. For inorganic pigments the ratio is about 3 to about 400, preferably about 5 to about 200.

In the case of organic pigments, the ink may contain up to approximately 30%, preferably about 0.1 to about 25%, and more preferably about 0.25 to about 10%, pigment by weight based on the total ink weight. If an inorganic pigment is selected, the ink will tend to contain higher weight percentages of pigment than with comparable inks employing organic pigment, and may be as high as about 75% in some cases, since inorganic pigments generally have higher specific gravities than organic pigments. Examples of inorganic pigments include titanium dioxide, iron oxides, and the like.

An advantage of the Solvent-to Water process for pigmented inkjet inks is that the optical density is improved relative to inks with similar dispersants, dispersed pigments and ink formulations.

An unexpected advantage of the inventive dispersion Solvent-to-Water process is that the amount of polymeric dispersant in solution is less than with conventional dispersion processes. A limitation of current pigment dispersion processes, especially for use in ink jet inks, is that the residual polymeric dispersant in solution is large. This puts extra polymer into the dispersant mixture and reduces subsequent formulation flexibility. If commonly used dispersion processes leave as much as 50% or more of the polymeric dispersant in solution significant adverse effects can occur.

This inventive process produces dispersions with as little as 20% of the polymer left in the bulk solution. Under some process conditions this can be reduced to 10% or lower. The amount of polymer in solution is determined by centrifugation, followed by determination of the amount of polymer left in the supernatant solution.

This reduced amount of polymeric dispersant in the bulk phase of the dispersion mixture is an important benefit for this dispersion process.

Other properties of the particle dispersion such as viscosity and conductivity are lower for the product of this inventive process. The reduction seems to be more than just the result of a reduction in free polymer. The reduced polymer seems to reduce the deleterious effects on the nozzles used in the ink jet process.

Another unexpected advantage of the inventive dispersion process is that very low acid containing dispersants may be used. In the case of low acid polyurethane dispersants, a polyurethane polymeric dispersant with an acid number of 10 was successful processed under the inventive processing conditions. In an example that utilizes a pigment as the dispersed particle, a pigment to dispersant ratio of 1:1 was considered necessary for the best dispersion. These low acid polyurethane dispersants have been described in (US20090259012)

A preferred use for the dispersions prepared by the Solvent-to-Water Process described above is the use in pigmented inkjet inks with pigments as the colorant. The pigment dispersion can be combined with other common inkjet ink components in any convenient order.

Ink Jet Ink Components

Aqueous Carrier Medium

The aqueous carrier medium (aqueous vehicle) for the inkjet inks is water or a mixture of water and at least one water-miscible organic solvent. Selection of a suitable mixture depends on requirements of the specific application, such as desired surface tension and viscosity, the selected pigment, drying time of the pigmented ink jet ink, and the type of paper onto which the ink will be printed. Representative examples of water-soluble organic solvents that may be selected include (1) alcohols, such as methyl alcohol, ethyl alcohol, n-propyl alcohol, iso-propyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thiodiglycol; (6) lower alkyl mono- or di-ethers derived from alkylene glycols, such as ethylene glycol mono-methyl (or -ethyl)ether, diethylene glycol mono-methyl (or -ethyl)ether, propylene glycol mono-methyl (or -ethyl)ether, triethylene glycol mono-methyl (or -ethyl)ether and diethylene glycol di-methyl (or -ethyl) ether; (7) nitrogen containing cyclic compounds, such as pyrrolidone, N-methyl-2-pyrrolidone, and 1,3-dimethyl-2-imidazolidinone; and (8) sulfur-containing compounds such as dimethyl sulfoxide and tetramethylene sulfone.

A mixture of water and a polyhydric alcohol, such as diethylene glycol, is preferred as the aqueous carrier medium. In the case of a mixture of water and diethylene glycol, the aqueous carrier medium usually contains from about 30% water/70% diethylene glycol to about 95% water/5% diethylene glycol. The preferred ratios are approximately 60% water/40% diethylene glycol to about 95% water/5% diethylene glycol. Percentages are based on the total weight of the aqueous carrier medium. A mixture of water and butyl carbitol is also an effective aqueous carrier medium.

The amount of aqueous carrier medium in the ink is typically in the range of about 70% to about 99.8%, and preferably about 80% to about 99.8%, based on total weight of the ink.

The aqueous carrier medium can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. 1,2-Alkanediols are preferably 1,2-C4-6 alkanediols, most preferably 1,2-hexanediol. Suitable surfactants include ethoxylated acetylene diols (e.g. Surfynols® series from Air Products), ethoxylated primary (e.g. Neodol® series from Shell) and secondary (e.g. Tergitol® series from Union Carbide) alcohols, sulfosuccinates (e.g. Aerosol® series from Cytec), organosilicones (e.g. Silwet® Series from Witco) and fluoro surfactants (e.g. Zonyl® series from DuPont).

The amount of glycol ether(s) and 1,2-alkanediol(s) added must be properly determined, but is typically in the range of from about 1 to about 15% by weight and more typically about 2 to about 10% by weight, based on the total weight of the ink. Surfactants may be used, typically in the amount of about 0.01 to about 5% and preferably about 0.2 to about 2%, based on the total weight of the ink.

Other Additives

Other additives, such as biocides, humectants, chelating agents and viscosity modifiers, may be added to the ink for conventional purposes. Biocides may be used to inhibit growth of microorganisms. Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), diethylenetriamine-N,N,N',N'',N''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Other polymer additives, if used, can be soluble or dispersed polymer(s). They can be any suitable polymer, for example, soluble polymers may include linear homopolymers, copolymers, block polymers or natural polymers. They also can be structured polymers including graft or branched polymers, stars, dendrimers, etc. The dispersed polymers can include latexes, polyurethane dispersions, etc. The polymers may be made by any known process including but not limited to free radical, group transfer, ionic, RAFT, condensation and other types of polymerization. Useful classes of polymers include, for example, acrylics, styrene-acrylics, urethanes and alginates.

These polymer additives can be effective in improving gloss and other properties while not sacrificing optical density. Other properties that can be affected by the polymer additives include, for example, reliability for thermal inkjet printing and image durability.

Ink Properties

Drop velocity, separation length of the droplets, drop size and stream stability are greatly affected by the surface tension and the viscosity of the ink. Ink jet inks typically have a surface tension in the range of about 20 dyne/cm to about 70 dyne/cm at 25° C. Viscosity can be as high as about 30 cP at 25° C., but is typically somewhat lower. The ink has physical properties that can be adjusted to the ejecting conditions and printhead design. The inks should have excellent storage stability for long periods so as not clog to a significant extent in an ink jet apparatus. Further, the ink should not corrode parts of the ink jet printing device it comes in contact with, and it should be essentially odorless and non-toxic.

Although not restricted to any particular viscosity range or printhead, lower viscosity inks can be used, and may be preferred for certain applications. Thus the viscosity (at 25° C.) of the inks can be less than about 7 cps, less than about 5 cps, or even less than about 3.5 cps.

Ink Sets

Ink sets suitable for use with the present invention comprise at least three primary color inks: a cyan ink, a magenta ink and a yellow ink (CMY), wherein at least one is prepared by the Solvent-to Water Process described above. The ink set may optionally contain additional inks, and particularly a black ink (making a CMYK ink set).

When the ink set contains a black ink, pigment is generally preferred for black from the standpoint of high optical density. A preferred black pigment is a carbon black pigment, and optionally a Self Dispersed Pigment black may be used. However when the black is prepared by the inventive Solvent-to-Water process the black ink will be a conventional black pigment with a polymeric dispersant.

The ink set may further comprise a fixing solution. See, for example, U.S. Pat. No. 5,746,818, U.S. Pat. No. 6,450,632, US20020044185, EP1258510 and US20040201658.

EXAMPLES

The following examples illustrate the present invention without, however, being limited thereto. Tests listed here are those that are commonly used for testing pigment dispersions and ink jet inks. Examples of test procedures are given in US20050090599.

Examples

Polymer Dispersant 1 BZMA/MAA 92/8 Random Linear Copolymer

A 5-liter flask was equipped with a mechanical stirrer, thermometer, $N_2$ inlet, drying tube outlet, and addition funnels. Tetrahydrofuran (THF), 1715.1 g, was charged to the flask. The catalyst (tetrabutyl ammonium m-chlorobenzoate, 1.2 ml of a 1.0 M solution in acetonitrile) was then added. Initiator (1-methoxy-1-trimethylsiloxy-2-methyl propene, 51.33 g (0.295 moles)) was injected. Feed I (tetrabutyl ammonium m-chlorobenzoate, 1.2 ml of a 1.0 M solution in acetonitrile and THF, 10.0 g) was started and added over 180 minutes. Feed II (trimethylsilyl methacrylate, 213.2 g (1.35 moles) and benzyl methacrylate (BZMA), 1334.5 g (7.58 moles)) was started at 0.0 minutes and added over 70 minutes.

At 173 minutes, 60.5 g of methanol was added to the above solution and distillation began. During the first stage of distillation 2-P was also added, 503.0 g of material was removed. The final polymer solution was 51.7% solids and the bulk of the solvent is 2P The polymer had a composition of BZMA/MAA 92/8, a molecular weight (Mn) of 5047 and an acid value of 0.99 (meq/gram of polymer solids.) based on total solids.

Polymer Dispersant 2 BZMA/MAA 92/8 Random Linear Copolymer

This polymer is made in a manner similar to Polymer Dispersant 1a except it is acid initiated with initiator, 1,1-bis (trimethylsilyloxy)-2-methyl propene in a manner-similar to example in US20050090599, paragraphs [0140 to 148].

Polymer Dispersant 3 BZMA/MAA 90/10 Random Linear Copolymer

This polymeric dispersant is made by a similar process as Polymeric Dispersant 1 except the mass ratios of the monomers are changed.

Polymeric Dispersant 4—ETEGMA//BZMA//MAA 3.6//13.6//10.8

The following is an example of how to make a block polymer that has both ionic as well as steric stabilization.

A 3-liter flask was equipped with a mechanical stirrer, thermometer, $N_2$ inlet, drying tube outlet, and addition funnels. THF, 291.3 g, was charged to the flask. The catalyst (tetrabutyl ammonium m-chlorobenzoate, 0.44 ml of a 1.0 M solution in acetonitrile) was then added. Initiator (1,1-bis (trimethylsiloxy)-2-methyl propene, 20.46 g (0.0882 moles)) was injected. Feed I (tetrabutyl ammonium m-chlorobenzoate, 0.33 ml of a 1.0 M solution in acetonitrile and THF, 16.92 g) was started and added over 185 minutes. Feed II (trimethylsilyl methacrylate, 152.00 g (0.962 moles)) was started at 0.0 minutes and added over 45 minutes. One hundred and eighty minutes after Feed II was completed (over 99% of the monomers had reacted), Feed III (benzyl methacrylate, 211.63 g (1.20 moles)) was started and added over 30 minutes. Forty minutes after Feed III was completed (over 99% of the monomers had reacted), Feed IV (ethoxytriethyleneglycol methacrylate, 78.9 g (0.321 moles)) was started and added over 30 minutes.

At 400 minutes, 73.0 g of methanol and 111.0 g of 2-pyrrolidone were added to the above solution and distillation begun. 352.0 g of material was removed, then more 2-pyrrolidone 340.3 g was added and an additional 81.0 g of material was distilled out. Finally, 2-pyrrolidone, 86.9 g total, was added. The final polymer solution was at 40.0% solids.

The polymer had a composition of ETEGMA//BZMA//MAA 3.6//13.6//10.8, a molecular weight (Mn) of 4200, and an acid value of 2:90 (meq/gram of polymer solids) based on total solids.

Polymeric Dispersant 5 Urea Terminated Polyether Diol IPDI/T650/DMPA AN10

A 2 L reactor was loaded with 529.8 g Terathane® 650, g 327.3 methylethylketone, and 19.6 g dimethylol propionic acid. The mixture was heated to 110° C. with N2 purge for 10 min. Then the reaction was cooled to 80° C., and 0.5 g dibutyl tin dilaurate was added. Over 30 minutes 238.5 g isophorone diisocyanate was added followed by 58.9 g methyl ethyl ketone. The reaction was held at 80° C. for 3.5 hrs when the % NCO was 1.2%. Then, 26.1 g bis(2-methoxy ethyl)amine was added over 5 minutes.

Distill MEK from the polyurethane solution under vacuum while adding 967.2 grams 2-pyrrolidone over about 5 hours. The final polyurethane solution had, a viscosity of 3980 cPs, 43.7% solids. %, GPC Mn 10330, polydispersity 1.9 and an acid number of 10.

Polymeric Dispersant 6 Urea Terminated Polyether Diol IPDI/T650/DMPA AN20

A 2 L reactor was loaded with 496.6 g Terathane® 650, 306.5 g methylethylketone, and 40.2 g dimethylol propionic acid. The mixture was heated to 110° C. with N2 purge for 10 min. Then the reaction was cooled to 80° C., and 0.6 g dibutyl tin dilaurate was added. Over 30 minutes 263.1.0 g isophorone diisocyanate was added followed by 65.1.0 g methyl ethyl ketone. The reaction was held at 80° C. for 2 hrs when the % NCO was below 1%. Then, 28.8 g bis(2-methoxy ethyl)amine was, added over 5 minutes.

Distill MEK from the polyurethane solution under vacuum while adding 985 grams 2-pyrrolidone over about 5 hours. The final polyurethane solution had a viscosity of 7950 cPs, 45.3% solids. %, GPC Mn 9350, polydispersity 1.9, and an acid number of 20.

Polymeric Dispersant 7 Urea Terminated Polyether Diol IPDI/T650/DMPA AN30

A 2 L reactor was loaded with 463.6 g Terathane® 650, 286.2 g methylethylketone, and 61.2 g dimethylol propionic acid. The mixture was heated to 110° C. with N2 purge for 10 min. Then the reaction was cooled to 80° C., and 0.7 g dibutyl tin dilaurate was added. Over 30 minutes 288. Isophorone diisocyanate was added followed by 73.1 g methyl ethyl ketone. The reaction was held at 80° C. for 3.5 hrs when the % NCO was 1.6%. Then, 31.6 g bis(2-methoxy ethyl)amine was added over 5 minutes.

Distill MEK from the polyurethane solution under vacuum while adding 1234 grams 2-pyrrolidone over about 5 hours. The final polyurethane solution had a viscosity of 5240 cPs, 40% solids. %, GPC Mn 8650, polydispersity 1.9, and an acid number of 30.

Dispersion Preparation 1 Black Dispersion in 2-Pyrrlidinone

A black pigment dispersion was prepared by mixing the following ingredients with adequate stirring:

| INGREDIENT | AMOUNT (GM) |
| --- | --- |
| 2-Pyrrlidinone | 623.65 |
| Potassium hydroxide (45.6% solids) | 3.12 |
| Polymeric Dispersant 1 | 63.22 |
| The above solution was mixed for 5 minutes @1000 RPM | |
| Black Pigment (Degussa Nipex 180IQ) | 60.00 |

The hydrogen bonding solubility parameter $\delta_h$ for 2-Pyrrlidinone 5.5. Pigment was added and processed on High Speed Disperser (HSD) for 2 hours @ 3000 RPM.

Then 450 gms of the above mixture was charged to the Eiger 250 ml minimill and was dispersed for 6 hours while adding 300 gms (1.25 gm per minute) of H2O over 4 hrs. Dispersion was then ultrafiltered 8 passes to remove to <1% 2-P and raise pigment level to 12.22%, with an average particle size of 93 nm.

The initial hydrogen bonding solubility parameter $\delta_h$~5.5 and the final dispersion liquid prior to ultrafiltration was ~12.1.

Dispersion Preparation 2a Black Dispersion in TEB

A black pigment dispersion was prepared by mixing the following ingredients with adequate stirring

| INGREDIENT | AMOUNT (GM) |
| --- | --- |
| TEB | 569.83 |
| Potassium hydroxide (45.6% solids) | 11.42 |
| Polymer Dispersant 4 | 93.75 |
| The above solution was mixed for 5 minutes @1000 RPM. | |
| Black Pigment (Degussa Nipex 180IQ) | 75.00 |

The hydrogen bonding solubility parameter $\delta_h$ for Triethylene glycol mono butyl ether is 3.9.
Pigment was added and processed on HSD for 2 hours @ 3000 RPM.

Then 500 gms of the above mixture was charged to the Microfluidizer and was dispersed for 60 minutes on recirculation while adding 500 gms (8.33 gm per minute) of H2O over 60 minutes. Dispersion was then ultrafiltered to remove to <1% solvent and raise pigment level to 11.13%, with an average particle size of 107 nm.

The initial hydrogen bonding solubility parameter $\delta_h$~4.5 and the dispersion liquid prior to ultrafiltration was ~12.6.

Dispersion Preparation 2b Black Dispersion

Dispersion preparation was made in a manner is similar to Dispersion 2 except the initial solvent was changed from TEB to an 80:20::TEB:water mix (wt/wt).

The initial hydrogen bonding solubility parameter $\delta_h$~7.3 and the final dispersion liquid was ~12.

Dispersion Preparation 3 Black Dispersion in TEB

A solvent black pigment dispersion was prepared by mixing the following ingredients with adequate stirring:

| INGREDIENT | AMOUNT (GM) |
| --- | --- |
| TEB | 455.08 |
| Potassium hydroxide (45.6% solids) | 11.42 |
| Polymer Polymeric Dispersant 4 | 93.75 |
| D.I Water | 114.75 |
| The above solution was mixed for 10 minutes @1000 RPM. | |
| Black Pigment (Degussa Nipex 180IQ) | 75.00 |

Pigment was added and processed on HSD for 2 hours @ 3000 RPM

Then 500 gms of the above mixture was charged to the Microfluidizer and was dispersed for 60 minutes on recirculation while adding 500 gms (8.33 gm per minute) of H2O over 60 minutes. Dispersion was then ultrafiltered to remove to <1% solvent and raise pigment level to 11.05%, with an average particle size of 102 nm.

The initial hydrogen bonding solubility parameter $\delta_h$~3.8 and the dispersion liquid prior to ultrafiltration was ~12.3.

Dispersion Preparation 4 Magenta Dispersion in 2-P

An aqueous magenta pigment dispersion was prepared by mixing the following ingredients with adequate stirring:

| INGREDIENT | AMOUNT (GM) |
| --- | --- |
| 2-Pyrrlidinone | 584.33 |
| Potassium hydroxide (45.9% solids) | 2.98 |
| Polymer Polymeric Dispersant 1 | 60.70 |
| The above solution was mixed for 5 minutes @1000 RPM. | |
| Magenta Pigment (Clariant Ink Jet E02 Magenta) | 72.00 |

Pigment was added and processed on HSD for 2 hours @ 3000 RPM

Charged 450 gms of to the minimill from Premier and milled for 6 hrs while adding 450 gms of DI water at a rate of 1.25 ml per minute.

The sample was ultrafiltered 8 passes to remove <1% 2-P and raise pigment level to 12.4%, with an average particle size of 79 nm.

The initial hydrogen bonding solubility parameter $\delta_h$~5.5 and the dispersion liquid prior to ultrafiltration was ~13.7.

Dispersion Preparation 5 Magenta Dispersion in 2-Pyrrlidinone with Addition of Neutralization in the Diluent Polar Solvent A solvent Magenta pigment dispersion was prepared by mixing the following ingredients with adequate stirring:

| INGREDIENT | AMOUNT (GM) |
| --- | --- |
| 2-Pyrrlidinone | 730.41 |
| Polymer Polymeric Dispersant 1 | 75.87 |
| The above solution was mixed for 5 minutes @1000 RPM | |
| Magenta Pigment (Clariant Ink Jet E02 Magenta) | 90.00 |

Pigment was added and processed on HSD for 2 hours @ 3000 RPM.

This was mixed and then 600 gms was charged and dispersed over 3 hours using a minimill from Premier. Then 150 gms was removed to leave 450 gms in mill to which 90 gms of H2O mixed with 1.86 gm (45.6%) KOH was added over 60 minutes (1.5 ml per minute), then 360 gms H2O was added over next 2 hrs (3 ml per minute). Total mill time was 6 hrs. Dispersion was then ultrafiltered 8 passes to remove to <1% 2-P and raise pigment level to 16.15%, with an average particle size of 131 nm.

The initial hydrogen bonding solubility parameter $\delta_h$~5.5 and the dispersion liquid prior to ultrafiltration was ~13.7.

Dispersion Preparation 6 Magenta Dispersion in 2-Pyrrlidinone

A solvent magenta pigment dispersion was prepared by mixing the following ingredients with adequate stirring:

| INGREDIENT | AMOUNT (GM) |
| --- | --- |
| 2-Pyrrlidinone | 730.41 |
| Potassium hydroxide (45.9% solids) | 3.72 |
| Polymer Polymeric Dispersant 1 | 75.87 |
| The above solution was mixed for 5 minutes @1000 RPM. | |
| Magenta Pigment (Clariant Ink Jet E02 Magenta) | 90.00 |

Pigment was added and processed on HSD for 2 hours @ 3000 RPM.

Then 450 gms of the above mixtures was charged to the minimill from Premier and was dispersed for 6 hours while adding 450 gms (1.25 gm per minute) of H2O over the same 6 hrs. Dispersion was then ultrafiltered 8 passes to remove to <1% 2-P and raise pigment level to 13.71%, with an average particle size of 94.4 nm.

The initial hydrogen bonding solubility parameter $\delta_h$~5.5 and the dispersion liquid prior to ultrafiltration was ~13.7. The starting point for this dispersion process is shown in FIG. 1 by the large triangle.

Dispersion Preparation 7 Black Dispersion in TEB

A solvent black pigment dispersion was prepared by mixing the following ingredients with adequate stirring:

| INGREDIENT | AMOUNT (GM) |
| --- | --- |
| Triethyleneglycol monobutyl ether | 1642.17 |
| Potassium hydroxide (45.0% solids) | 10.05 |
| Polymer Polymeric Dispersant 3 | 147.78 |
| The above solution was mixed for 15 minutes @ 1000 RPM. | |
| Black Pigment (Degussa Nipex 180) | 200.00 |

Pigment was added and processed on High Speed Disperser (HSD) for 3 hours @ 2000 RPM.

Then 400 gms of the above mixture was charged to a smaller HSD and dispersed for 1 hour while adding 300 gms (5.0 ml per minute) of H2O over 1 hour. The average pigment size fell to 281.9 nm. The dispersion was then charged to an Eiger 250 ml mini mill and dispersed for 5 hours. The average pigment size was further reduced to 119.3 nm and the free polymer level was 13.4%.

The initial hydrogen bonding solubility parameter $\delta_h \sim 4$ and the dispersion liquid prior to ultrafiltration was ~9.

Dispersion Preparation 8 Black Dispersion in Isopropyl Alcohol

A magenta pigment dispersion was prepared by mixing the following ingredients with adequate stirring:

| INGREDIENT | AMOUNT (GM) |
| --- | --- |
| IPA | 1524.57 |
| Potassium hydroxide (45.6% solids) | 19.84 |
| Polymer Polymeric Dispersant 3 | 295.58 |
| The above solution was mixed for 5 minutes @1000 RPM. | |
| Magenta Pigment (Clariant R-122 EO2 VP2621) | 400.00 |
| Pigment was added and processed on HSD for 3 hours @ 2000 RPM. | |

Then 400 gms of the above mixture was charged to an Eiger 250 ml mini mill and dispersed while adding D.I. Water at a rate of 5 ml per minute for 1 hour. The particle size fell to 176.7 nm. After the water addition was over the dispersion was dispersed in the mill for a further 5 hours. The average pigment size was further reduced to 120.2 nm and the free polymer level was 18.3%.

The initial hydrogen bonding solubility parameter $\delta_h \sim 7.8$ and the dispersion liquid prior to ultrafiltration was ~14.25.

Dispersion Preparation 9 Magenta Dispersion in Mixed 2P/TEB Solvent and a 2.5 Pigment-to-Dispersant Ratio

| INGREDIENT | AMOUNT (GM) |
| --- | --- |
| Triethyleneglycol monobutyl ether | 307 |
| 2-P | 307 |
| Potassium hydroxide (45.0% solids) | 5.5 |
| Polymer Polymeric Dispersant 2 | 119 |
| The above solution was mixed for 15 minutes @ 1000 RPM. | |
| Magenta Pigment (Clariant Ink Jet E02 Magenta) | 135.00 |
| Pigment was added and processed on High Speed Disperser (HSD) for 3 hours @ 2000 RPM. The initial premix pigment concentration was 15.4%; and an initial viscosity of 454 cps. | |

300 grams of this mixture was transferred to an Eiger mill. The mill was run while the water added continuously. A total of 270 grams of water was added. The final concentration of the process was about 8.1% pigment. The final particle size was 76 nm.

Dispersion Preparation 10 to 17

Similar processing to Dispersion Preparation 9 was done while varying the P/D ratio from 1.5 to 8, by adding different amounts of polymeric dispersant.

TABLE 2

Inventive Dispersions 10-17

| Dispersion Preparation | Pigment/Dispersion | Final D50 |
| --- | --- | --- |
| 10 | 1.5 | 100 |
| 11 | 3.5 | 89 |
| 12 | 4.0 | 82 |
| 13 | 4.5 | 86 |
| 14 | 5 | 83 |
| 15 | 6 | 85 |
| 16 | 7 | 88 |
| 17 | 8 | 75 |

The initial hydrogen bonding solubility parameter $\delta_h \sim 4.7$ and the final dispersion liquid was 12.4. The Solvent-to-Water process provides to obtain stable dispersions with considerable breadth in the P/D ratio. The 6, 7 and 8 P/D ratio is unusual high for this polymeric dispersant/pigment combination.

Dispersion Preparation 18-24

Dispersions prepared in a manner similar to Dispersion Preparation 9 except the dispersant was a polyurethane with variable pigment/dispersant ratios.

TABLE 3

Inventive Dispersions 18-24

| Inventive Dispersion number | Pigment/dispersant | Dispersant/Acid number | D50 |
| --- | --- | --- | --- |
| 18 | 2.0 | 5; 10 | 306.0 |
| 19 | 1.5 | 5; 10 | 222.6 |
| 20 | 1.0 | 5; 10 | 149.2 |
| 21 | 3.0 | 6; 20 | 176.5 |
| 22 | 2.0 | 6; 20 | 112.2 |
| 23 | 3.5 | 7; 30 | 157.0 |
| 24 | 3.0 | 7; 30 | 110.5 |

Based on the final particle size and other observations it was judged that for the polyurethane with an acid number 30 the best P/D was 3; for the polyurethane with an acid number 20 the best P/D was 2; and for the polyurethane with an acid number 10 the best P/D was 1. This 1/1 ratio is unusually low for these systems.

Dispersion Preparations 25-27

Dispersion preparations were made in a manner identical to Dispersion 2 except the initial solvent was changed from TEB to a 60:40::TEB:water mix (wt/wt) and the final dispersion liquid was 28:72::TEB:water. The Polymeric Dispersant was Dispersant 3. Dispersion Preparation 25 had a Pigment to Dispersant ratio of 2.5. Dispersion Preparation 26 had a Pigment to Dispersant ratio of 3.5. Dispersion Preparation 27 had a Pigment to Dispersant ratio of 4. The initial hydrogen bonding solubility parameter $\delta_h \sim 10.6$ and the final dispersion liquid was ~16.

Dispersion Preparation 28 White Dispersion in TEB

A solvent white pigment dispersion was prepared by mixing the following ingredients with adequate stirring:

| INGREDIENT | AMOUNT (GM) |
| --- | --- |
| Triethylene glycol monobutyl ether (TEB) | 160.33 |
| Potassium hydroxide (45.6% solids) | 0.88 |
| Polymeric Dispersant 1 | 13.79 |
| The above solution was mixed for 15 minutes at 1000 RPM | |
| Titanium Dioxide White Pigment (DuPont Ti-Pure R706)) | 325.00 |
| The hydrogen bonding solubility parameter $\delta_h$ for TEB is ~4.0. | |
| Pigment was added and processed on High Speed Disperser (HSD) for 1 hours @ 2000 RPM. | |

Then the above mixture was charged to a beaker milli charged with 1 mm zirconia media and was dispersed initially for 33 minutes. Then it was dispersed for another 11 minutes while adding 160 gms (14.54 gm per minute) of H2O over the 11 minutes. It was then ground for an additional 11 minutes. Dispersion was then ultrafiltered 6 passes to remove to <5% TEB and raise pigment level to 44.46%, with an average particle size of 692 nm.

The initial hydrogen bonding solubility parameter $\delta_h$~4.0 and the dispersion liquid prior to ultrafiltration was ~15.3.

Comparison Dispersion Preparation 1 Magenta Dispersion in Mek and No Addition of Polar Diluent A magenta pigment dispersion was prepared by mixing the following ingredients with adequate stirring:

| INGREDIENT | AMOUNT (GM) |
| --- | --- |
| MEK | 430.11 |
| Potassium hydroxide (45.9% solids) | 3.72 |
| Polymer Polymeric Dispersant 1 | 75.87 |
| The above solution was mixed for 5 minutes @1000 RPM. | |
| Magenta Pigment (Clariant Ink Jet E02 Magenta) | 72.00 |
| Pigment was added and processed on HSD for 2 hours @ 3000 RPM. | |

This was mixed and then dispersed over 4 hours using a minimill from Premier. During milling the above mixture was diluted with 200 gm of MEK to keep the flow going to yield a mixture with 11.5% pigment having an average particle size of 300 nm.

Since no polar diluent was added the solubility parameter during this process was unchanged. The high particle size indicates that little if any dispersion processing occurred. In FIG. 1 this point is denoted by a diamond.

Comparison Dispersion preparation 2 Magenta Dispersion in 2-Pyrrlidinone:water::85:15

An aqueous magenta pigment dispersion was prepared by mixing the following ingredients with adequate stirring:

| INGREDIENT | AMOUNT (GM) |
| --- | --- |
| 2-Pyrrlidinone | 544.65 |
| Water | 101 |
| Potassium hydroxide (45.9% solids) | 2.56 |
| Polymer Polymeric Dispersant 1 | 54. |
| The above solution was mixed for 5 minutes @1000 RPM. | |

| INGREDIENT | AMOUNT (GM) |
| --- | --- |
| Magenta Pigment (Clariant Ink Jet E02 Magenta) | 135.00 |

Pigment was added and processed on HSD. Severe foaming and a hard crust on the top of the liquid was observed. This crust redisolved into the liquid. Foaming was so severe that the process was allowed to stand for 16 hours. The entire batch was set hard and the batch was not continued. The hydrogen bonding/polar solubility point for this 85:15 composition is shown on FIG. 1 with an asterisk in a black background.

Comparison Dispersion Preparation 3 Black Pigment: 92/8 Polymer

The dispersion was prepared with the following recipe:

| INGREDIENT | AMOUNT (GM) |
| --- | --- |
| Polymer (From polymer preparation 1) | 80.14 |
| Lithium Hydroxide (98% solid) | 1.43 |
| Deionized water | 140 |
| Carbon Black (FW-18 Degussa) | 75 |
| Proxel GXL | 3.7 |
| Dowanol DPM | 319.73 |

The listed ingredients were well mixed and then dispersed using a Microfluidics system. Above was then diluted with 138 gms of water and dispersed again with a Microfluidics system to yield a 10% pigmented dispersion with average particle size of 119 nm.

Comparison Dispersion Preparation 4 Black Pigment

Comparison Dispersion 4 was made in a manner similar to Dispersion preparation 25 except the dispersion solvent was 100% water.

Comparison Dispersion Preparation 5 Black Pigment

Comparison Dispersion 5 was made in a manner similar to Dispersion preparation 26 except the dispersion solvent was 100% water. The Pigment to Dispersant ratio was 2.5.

Comparison Dispersion Preparation 6 Black Pigment

Comparison Dispersion 6 was made in a manner similar to Dispersion preparation 2a except the dispersion solvent was 100% water.

Free Polymer Determination in Inks and Dispersions

Procedure

A pigmented dispersion is diluted 1:1 with deionized water and then centrifuged at 20,000 rpm for 2 hours, using a Beckman L-8 Ultracentrifuge. A pigmented ink is not diluted prior to centrifugation. The pigment-free supernatant is analyzed for unbound polymer by a gravimetric % solids method.

The % solids is determined for the supernatant by placing a known amount of supernatant in a weigh dish in an oven at 150 degrees C. for 3 hours. Solids must be corrected for any dilution prior to centrifugation.

The free polymer is calculated based on this determination. The free polymer can also be determined by centrifuging the dispersion in a similar manner and performing an HPLC on the supernatant solution. Calibration of the HPLC is done by known concentrations of the neutralized polymeric dispersants.

Alternately, a gravimetric method may be used. In this method a weighed amount of supernatant is dried to a constant weight and the amount of weight is attributed to free polymer.

Tests of Polymeric Dispersions and Inks

Example 1

Dispersion Preparation 1 and Comparative Disp Prep 3

Dispersion Preparation 1 and Comparative Dispersion Preparation 3 were tested and were used for ink preparation. The ink vehicle was 4 wt % 1,2 hexanediol, 15% glycerol, 5% ethylene glycol and 0.2% Surfynol® 465.

TABLE 4

Inventive Example 1 and Comparative Example 1

|  | Comp Ex 1 Comp Disp Prep | Inv Ex 1 Disp Prep 1 |
|---|---|---|
| Particle size | 148 | 79 |
| Viscosity, dispersion | 15 | 8 |
| Viscosity, diluted into an ink | 3.1 | 2.75 |
| Conductivity, as the concentration | 1.96 | 1 |
| Conductivity, as the ink | 0.39 | 0.31 |
| Gloss 60 @ 80% | 39 | 65 |
| OD | 1.13 | 1.13 |
| Stability; after 14 days at 70° C. | | |
| Viscosity | 22 | 2.9 |
| Particle size | 199 | 84 |
| Free polymer in the Dispersion liquid | 35% | 10 |

The Inventive Dispersion as the Dispersion Preparation 1 and as the Ink 1 had lower particle size, viscosity, conductivity. Stability testing was done by holding samples for 14 days at 70° C. and retesting. While the OD was similar the gloss was significantly better for the inventive dispersion.

The free polymer is dramatically lower in the inventive dispersion—35 vs. 10 wt %.

Example 2-4

Dispersion Preparations 11, 12, and 13

The Inventive Dispersion was prepared as described above. After the preparation they were heated to 70° C. for varying lengths of time.

TABLE 5

Inventive Example 2-4

| Test Day after storage at 70° C. Date | Conductivity | pH | Viscosity | d50 |
|---|---|---|---|---|
| Inv. Example 2 Dispersant 11 | | | | |
| 0 | 0.611 | 8.44 | 17.6 | 89 |
| 3 | 0.693 | 8.95 | 7.4 | |

TABLE 5-continued

Inventive Example 2-4

| Test Day after storage at 70° C. Date | Conductivity | pH | Viscosity | d50 |
|---|---|---|---|---|
| 15 | 0.79 | 8.47 | 5.38 | |
| 27 | 0.863 | 8.47 | 4.71 | 88 |
| 42 | 0.901 | 8.33 | 4.81 | 88 |
| Inventive Example 3 Dispersant 12 | | | | |
| 0 | 0.575 | 8.37 | 13.6 | 83 |
| 3 | 0.679 | 8.81 | 5.5 | |
| 15 | 0.803 | 8.39 | 4.58 | 84 |
| 27 | 0.833 | 8.28 | 4.63 | 100 |
| 42 | 0.894 | 8.3 | 6.26 | |
| Inventive Example 4 Dispersant 13 | | | | |
| 0 | 0.575 | 8.37 | 13.6 | 89 |
| 3 | 0.679 | 8.81 | 5.5 | |
| 15 | 0.803 | 8.39 | 4.58 | |
| 27 | 0.833 | 8.28 | 4.63 | 95 |
| 42 | 0.894 | 8.3 | 6.26 | 115 |

Each of these Inventive Dispersions had stable particle size, viscosity, pH, and conductivity. After heating the dispersions for varying lengths of time at 70° C. the particle size, viscosity, pH, and conductivity changed very little indicating stable dispersions.

Inventive Example 5 and 6

Inventive Dispersions 5, 6 and Comparative Example 2 were prepared and tested. The dispersions were heated to 70° C. for 7 and 14 days and retested.

TABLE 6

Inventive Example 5 and 6 Comparative 2

| Comment | % pigment | PH | Cond (ms) | Visc (60) | D50 |
|---|---|---|---|---|---|
| Comp Example 2 Comp Disp 6 | 15.00 | 7.73 | 4.83 | 9.86 | 105.10 |
| Inv Example 5 Disp 2a | 11.13 | 7.61 | 2.48 | 5.91 | 107.70 |
| Inv Example 6 Disp 2b | 11.06 | 7.62 | 2.71 | 5.62 | 102.80 |
| After 7 Days at 70 C. | | | | | |
| Comp Example 2 Comp Disp 6 | 15.00 | 7.61 | 5.06 | 9.90 | 106.80 |
| Inv Example 5 Disp 2a | 11.13 | 7.36 | 2.84 | 4.16 | 102.20 |
| Inv Example 6 Disp 2b | 11.06 | 7.39 | 2.98 | 3.84 | 103.90 |
| After 14 Days at 70 C. | | | | | |
| Comp Example 2 Comp Disp 6 | 15.00 | 7.60 | 5.04 | 9.57 | 107.30 |
| Inv Example 5 Disp 2a | 11.13 | 7.04 | 3.00 | 3.81 | 102.70 |
| Inv Example 6 Disp 2b | 11.06 | 7.19 | 2.86 | 3.64 | 103.80 |

The inventive dispersions had significantly lower viscosity and conductivity than the conventionally processed dispersion. When tested after 7 and 14 days the Inventive Dispersions had properties comparable to the Comparable Example 2 indicating that the Inventive Dispersions are stable. The polymer left in the Dispersion liquid was 63% for Comp Example 5, 35% for Inv Disp 2a and 39% for Inv Disp 2b.

Inventive Ink Example 2, 3, and 4 Dispersion Preparations 25, 26 and 27

The Inventive Dispersions were prepared and the properties tested. Then they were ultrafiltered to remove solvent and stored for 7 days at 70° C. and retested.

TABLE 7

Inventive Example 7-9

|  | % < .204 | 50% | 95% | pH | Cond. | Visc. | % Solids | % Pig |
|---|---|---|---|---|---|---|---|---|
| Inv Ex. 7 Disp 25 | 95.17 | 95.9 | 202.9 |  |  |  |  |  |
| After Ultrafiltration | 98.31 | 112.4 | 181.2 | 9.07 | 1.734 | 4.74 | 17.48 | 12.48 |
| After One Week of Storage at 70 C. | 97.46 | 107 | 187.7 | 9.23 | 1.85 | 3.67 |  |  |
| Inv Ex. 8 26 | 97.39 | 102.2 | 185.9 |  |  |  |  |  |
| After Ultrafiltration | 94.7 | 87.8 | 207.2 | 9.36 | 1.559 | 4.81 | 16.73 | 13 |
| After One Week of Storage at 70 C. | 97.26 | 104.8 | 185.7 | 9.26 | 1.65 | 3.82 |  |  |
| Inv Ex. 9 27 | 84.62 | 122.6 | 246.9 |  |  |  |  |  |
| After Ultrafiltration | 95.72 | 121.7 | 200.4 | 9.27 | 1.4 | 9.1 | 15.81 | 12.65 |
| After One Week of Storage at 70 C. | 95.99 | 117.3 | 198.9 | 9.25 | 2.55 | 6.57 |  |  |

** viscosity measured at 30 rpm; all others measured at 60 rpm
Dispersions 25-27 demonstrated excellent stability after the seven day test at 70° C.

These dispersions were converted to inks and printed and the optical density measured. These samples were printed with a fixed printhead and a rotating drum target. The 13 u gram print density represents printing on the paper a second time with a time delay of less than 2 seconds.

TABLE 8

Inventive Ink Example 2-4

| Magenta OD st'd milling vs. solvent to water | Comparative Ink Example 2 Comparative Dispersion 6 | Inventive Ink Example 2 Inv Disp 25 | Inventive Ink Example 3 Inv Disp 26 | Inventive Ink Example 4 Inv Disp 27 |
|---|---|---|---|---|
| Print density 7 u gm/mm2 | | | | |
| Xerox 4200 | 0.74 | 0.75 | 0.75 | 0.74 |
| HP Multipurpose | 0.87 | 0.95 | 0.91 | 0.93 |
| Xerox 4200 PP | 0.88 | 0.99 | 0.98 | 0.95 |
| Print density 13 u gm/mm2 | | | | |
| Xerox 4200 | 0.82 | 0.83 | 0.82 | 0.82 |
| HP Multipurpose | 1.21 | 1.31 | 1.32 | 1.27 |
| Xerox 4200 PP | 1.19 | 1.28 | 1.28 | 1.30 |

The optical density for the Inventive ink Examples were significantly improved over the Comparative Ink.

The invention claimed is:

1. A process for preparing a dispersion of particles, comprising the steps of
   a) preparing an initial mixture comprising an initial solvent, dispersible particles, at least one polymeric dispersant, and optionally a neutralizing agent;
   b) subjecting the initial mixture to dispersion treatment while adding a polar diluent liquid, such that the final dispersion of the particles is a stable dispersion; and
   wherein the hydrogen bonding solubility parameter of a final solvent mixture is at least 1.5 units higher than the initial solvent and is greater than 9;
   where the hydrogen bonding solubility parameters are calculated based on Hansen parameters and weight/weight additive calculations;
   and where the polar diluent liquid is added in at least three aliquots.

2. A process according to claim 1, wherein the hydrogen bonding solubility parameter component of the final solvent mixture is at least 2 units higher than the initial mixture of the solvent blend.

3. A process according to claim 1, wherein the neutralizing agent is added to the initial solvent.

4. A process according to claim 1, wherein the neutralizing agent is added with the polar diluent liquid.

5. A process according to claim 1, wherein the initial solvent comprises at least one organic solvent selected from ethers, ketones, aldehydes, esters, nitrogen compounds, sulfur compounds, carboxylic acids, acid halides, anhydrides, and alcohols.

6. A process according to claim 4, wherein the initial solvent has up to 50 weight percent water.

7. A process according to claim 1, wherein the initial solvent and added polar diluent liquid are chosen such that while the polar diluent liquid is added the dispersing liquid is one phase.

8. A process according to claim 1, wherein the added polar diluent mixture is chosen from alcohols and water and mixtures thereof.

9. A process according to claim 1, wherein the added polar diluent is water.

10. A process according to claim 1, wherein the polymeric dispersant is a random polymer.

11. A process according to claim 1, wherein the polymeric dispersant is a random polymer with an acid number of less than about 65 mg KOH/gram of solid polymer.

12. A process according to claim 1, wherein the polymeric dispersant is a structured polymer.

13. A process according to claim 1, wherein the polymeric dispersant is an ionically stabilized polymeric dispersant.

14. A process according to claim 1, wherein the polymeric dispersant is a polyurethane polymeric dispersant.

15. A process for preparing an aqueous pigment dispersion, comprising the steps of
   a) preparing an initial solvent, pigment particles, a polymeric dispersant, and optionally a neutralizing agent;
   b) subjecting the initial solvent to dispersion treatment while adding sufficient polar diluent liquid, such that the dispersion of pigment particles is a stable dispersion and
   wherein the hydrogen bonding solubility parameter component of the final solvent mixture is at least 1.5 units higher than the initial solvent and is greater than 9;

where both the hydrogen bonding is calculated based on Hansen parameters and weight/weight additive calculations;

and the polar diluent liquid is added in at least three aliquots.

16. An aqueous pigmented ink jet ink comprising the aqueous pigment dispersion of claim 15.

17. The aqueous pigmented ink jet ink of claim 16, having a surface tension in the range of about 20 dyne/cm to about 70 dyne/cm at 25° C., and a viscosity of lower than about 30 cP at 25° C.

18. An ink set comprising at least one cyan ink, at least one magenta ink and at least one yellow ink, wherein at least one of the inks is an aqueous pigmented ink jet ink as set forth in claim 16.

19. A method for ink jet printing onto a substrate, comprising the steps of:

(a) providing an ink jet printer that is responsive to digital data signals;
(b) loading the printer with a substrate to be printed;
(c) loading the printer with an ink as set forth in claim 17; and
(d) printing onto the substrate using the ink or inkjet ink set in response to the digital data signals.

20. A method for ink jet printing onto a substrate, comprising the steps of:

(a) providing an ink jet printer that is responsive to digital data signals;
(b) loading the printer with a substrate to be printed;
(c) loading the printer with an ink set as set forth in claim 18; and
(d) printing onto the substrate using the ink or inkjet ink set in response to the digital data signals.

* * * * *